United States Patent
Hayashi et al.

(10) Patent No.: US 9,843,077 B2
(45) Date of Patent: Dec. 12, 2017

(54) METHOD FOR PROCESSING FLUORINE-CONTAINING ELECTROLYTE SOLUTION

(71) Applicant: MITSUBISHI MATERIALS CORPORATION, Tokyo (JP)

(72) Inventors: Hiroshi Hayashi, Iwaki (JP); Koichiro Hirata, Iwaki (JP); Hidenori Tsurumaki, Iwaki (JP); Hisashi Hoshina, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 14/778,701

(22) PCT Filed: Sep. 26, 2013

(86) PCT No.: PCT/JP2013/076083
§ 371 (c)(1),
(2) Date: Sep. 21, 2015

(87) PCT Pub. No.: WO2014/155784
PCT Pub. Date: Oct. 2, 2014

(65) Prior Publication Data
US 2016/0049699 A1    Feb. 18, 2016

(30) Foreign Application Priority Data

Mar. 29, 2013    (JP) .................................. 2013-071367

(51) Int. Cl.
*H01M 10/54*    (2006.01)
*C01F 11/22*    (2006.01)
*C10L 1/02*    (2006.01)

(52) U.S. Cl.
CPC ............. *H01M 10/54* (2013.01); *C01F 11/22* (2013.01); *C10L 1/02* (2013.01); *C10L 2290/06* (2013.01);
(Continued)

(58) Field of Classification Search
CPC .... C10L 1/02; C10L 2290/06; C10L 2290/54; C10L 2290/541; C10F 11/22; Y02W 30/84; H01M 10/54; H01M 2300/0034
See application file for complete search history.

(56) References Cited

U.S. PATENT DOCUMENTS

2008/0050295 A1    2/2008  Uchida et al.
2015/0140332 A1*   5/2015  Boll ...................... C01D 15/04
                                                          428/402
2015/0246827 A1*   9/2015  Izawa .................... C02F 1/001
                                                          210/252

FOREIGN PATENT DOCUMENTS

CN         1819326 A        8/2006
CN         100530813 C      8/2009
(Continued)

OTHER PUBLICATIONS

International Search Report dated Dec. 3, 2013, issued for PCT/JP2013/076083.
(Continued)

*Primary Examiner* — Cephia D Toomer
(74) *Attorney, Agent, or Firm* — Locke Lord LLP

(57) ABSTRACT

A method for processing a fluorine-containing electrolyte solution including a gasification step of gasifying a volatile component of an electrolyte solution including a fluorine compound by heating the electrolyte solution under reduced pressure, a fluorine immobilization step of immobilizing the fluorine component included in the gasified gas as calcium fluoride by allowing the fluorine component to react with calcium, and an organic solvent component collection step
(Continued)

of collecting an organic solvent component included in the gasification gas, in which, preferably, after a small amount of water, aqueous mineral acid solution, or the like is added to the electrolyte solution, the volatile component of the electrolyte solution is gasified by heating the electrolyte solution under reduced pressure.

15 Claims, 3 Drawing Sheets

(52) U.S. Cl.
CPC ..... *C10L 2290/54* (2013.01); *C10L 2290/541* (2013.01); *H01M 2300/0034* (2013.01); *Y02W 30/84* (2015.05)

(56) References Cited

FOREIGN PATENT DOCUMENTS

| | | |
|---|---|---|
| JP | 2721467 B2 | 3/1998 |
| JP | 3079285 B2 | 8/2000 |
| JP | 2005-026089 A | 1/2005 |
| JP | 2006-004884 A | 1/2006 |
| JP | 3935594 B2 | 6/2007 |
| WO | 2012/127291 A1 | 9/2012 |

OTHER PUBLICATIONS

Office Action dated Dec. 16, 2016, issued for the Chinese patent application No. 201380074377.5 and English translation thereof.

\* cited by examiner

METHOD FOR PROCESSING FLUORINE-CONTAINING ELECTROLYTE SOLUTION

TECHNICAL FIELD

The present invention relates to a safe method for processing a nonaqueous electrolyte solution which is used in a lithium ion battery or the like.

Priority is claimed on Japanese Patent Application No. 2013-071367, filed Mar. 29, 2013, the content of which is incorporated herein by reference.

BACKGROUND ART

A large-sized lithium ion battery for supplying high capacity electricity is generally used in an electric vehicle or an electronic device, and the processing of the used large-sized battery which is generated in a large quantity becomes a problem due to the prevalence of the electric vehicle or the electronic device.

An electrolyte solution used in the lithium ion battery or the like includes a fluorine compound which is an electrolyte ($LiPF_6$, $LiBF_4$, or the like) and a volatile organic solvent, and the organic solvent is a flammable substance which is mainly ester carbonates. In addition, when $LiPF_6$ reacts with water, $LiPF_6$ is hydrolyzed and generates toxic hydrogen fluoride. For this reason, a safe processing method is required.

As a method for processing the lithium ion battery, and the electrolyte solution thereof, in the related art, the following methods for processing are known.

1. A processing method in which the lithium ion battery or the like is frozen at a temperature lower than or equal to a melting point of the electrolyte solution, the battery is demolished and crushed, the electrolyte solution is separated in the organic solvent from a crushed body, and the extracted electrolyte solution is distilled and is separated into the electrolyte and the organic solvent (for example, refer to PTL 1).

2. A processing method in which the used lithium battery is roasted, a roasted substance thereof is crushed and is sorted into a magnetic substance and a non-magnetic substance, and the substance having a large amount of useful metal such as aluminum or copper is collected (for example, refer to PTL 2).

3. A processing method in which the lithium battery is opened by ultrahigh pressure water, and the electrolyte solution is collected by using an organic solvent (for example, refer to PTL 3).

CITATION LIST

Patent Literature

[PTL 1] Japanese Patent No. 3935594
[PTL 2] Japanese Patent No. 3079285
[PTL 3] Japanese Patent No. 2721467

SUMMARY OF INVENTION

Problem to be Solved by the Invention

In the processing method of the related art, the processing method in which the lithium battery is demolished and crushed while being frozen requires refrigeration equipment, and thus it is difficult to perform this method. In addition, in the processing method in which the lithium battery is roasted, fluorine is processed as combustion gas. Therefore, fluorine cannot be recycled since it cannot be collected as fluorine component having high purity. In the processing method of collecting the electrolyte solution by using the organic solvent, it is difficult to process the collected electrolyte solution. As indicated above, the flammable organic solvent is included in the electrolyte solution, and the fluorine compound in the electrolyte solution reacts with water and generates toxic hydrogen fluoride, and thus safe processing is required.

An object of the present invention is to solve the problems of the processing methods of the related art described above, and is to provide a method in which a volatile fluorine compound ($LiPF_6$ or the like) and an electrolyte solution including an organic solvent are processed safely.

Means for Solving the Problem

The present invention provides a method for processing a fluorine-containing electrolyte solution having the following step.

[1] A method for processing a fluorine-containing electrolyte solution including a volatile fluorine compound and an organic solvent, the method including a gasification step of gasifying a volatile component by heating the electrolyte solution under reduced pressure; a fluorine immobilization step of immobilizing the fluorine component included in the gasified gas as calcium fluoride by allowing the fluorine component to react with calcium; and an organic solvent component collection step of collecting an organic solvent component in the gasification gas.

[2] The method for processing a fluorine-containing electrolyte solution according to [1] described above, in which, in the gasification step, the volatile component of the electrolyte solution is gasified by heating the electrolyte solution under reduced pressure after adding water or an aqueous mineral acid solution to the electrolyte solution.

[3] The method for processing a fluorine-containing electrolyte solution according to [1] or [2] described above, in which the gas in which the volatile component of the electrolyte solution is gasified is introduced to a wet processing step, and in the wet processing step, the fluorine component and the organic solvent component included in the gas are subjected to water cooling capture, the captured liquid is subjected to oil and water separation, the organic solvent component is collected, a calcium compound is added to a separated water phase, and fluorine in the water phase reacts with calcium, and calcium fluoride is generated.

[4] The method for processing a fluorine-containing electrolyte solution according to [1] or [2] described above, in which the gas in which the volatile component of the electrolyte solution is gasified is introduced to a wet processing step, and in the wet processing step, the fluorine component and the organic solvent component included in the gas are condensed and captured, a calcium compound is added to the captured liquid, fluorine reacts with calcium, and calcium fluoride is generated.

[5] The method for processing a fluorine-containing electrolyte solution according to [1] or [2] described above, in which the gas in which the volatile component of the electrolyte solution is gasified is introduced to a wet processing step, and in the wet processing step, the gas is in contact with the mixed solution, fluorine in the gas is absorbed by a calcium compound mixed solution, calcium fluoride is generated by allowing fluorine to react with calcium, the gas passing through the mixed solution is condensed, and the organic solvent component is collected.

[6] The method for processing a fluorine-containing electrolyte solution according to [1] or [2] described above, in which the gas in which the volatile component of the electrolyte solution is gasified is introduced to a dry processing step, and in the dry processing step, the gasification gas passes through a filling layer of the calcium compound, fluorine in the gas reacts with calcium, calcium fluoride is generated, the gas passing through the filling layer is condensed, and the organic solvent component is collected.

[7] The method for processing a fluorine-containing electrolyte solution according to any one of [3] to [6] described above, in which the electrolyte solution is heated at 80° C. to 150° C. under reduced pressure of 5 kPa to ordinary pressure, the volatile component is gasified, and the gasified gas is introduced to the wet processing step or the dry processing step.

[8] The method for processing a fluorine-containing electrolyte solution according to [1] described above, in which the electrolyte solution is heated at 80° C. to 150° C. under reduced pressure of less than or equal to 1 kPa, the volatile component is gasified, and the gasified gas is introduced to a dry processing step.

[9] The method for processing a fluorine-containing electrolyte solution according to any one of [1] to [8] described above, in which calcium fluoride is collected and recycled, and the collected organic solvent component is used as fuel or alternative fuel.

[10] The method for processing a fluorine-containing electrolyte solution according to any one of [1] to [9] described above, in which a pipe passage is connected to an opening portion of a used battery which includes the electrolyte solution including the fluorine compound, the used battery is heated under reduced pressure, the volatile component of the electrolyte solution is gasified, and the gasified gas is introduced to the fluorine immobilization step and the organic solvent collection step through the pipe passage and is processed.

[11] The method for processing a fluorine-containing electrolyte solution according to [10] described above, in which a safety valve of the used lithium ion battery is opened, the pipe passage is connected to the opening, and the volatile component of the electrolyte solution is gasified by heating the battery under reduced pressure.

[12] The method for processing a fluorine-containing electrolyte solution according to [10] described above, in which a safety valve of a plurality of used lithium ion batteries is opened, the batteries are contained in a hermetic container, the pipe passage is connected to the container, and the volatile component of the electrolyte solution is gasified by heating the batteries under reduced pressure.

[13] The method for processing a fluorine-containing electrolyte solution according to [2] described above, in which an amount of the water or the aqueous mineral acid solution which is added to the electrolyte solution is 5% to 20% with respect to a weight of the electrolyte solution.

DESCRIPTION OF EMBODIMENTS

Hereinafter, the present invention will be specifically described. Furthermore, "%" described later indicates "mass %".

A method for processing a fluorine-containing electrolyte solution of the present invention includes, a gasification step of gasifying a volatile component of the electrolyte solution including a fluorine compound by heating the electrolyte solution under reduced pressure; a fluorine immobilization step of immobilizing the fluorine component included in the gasified gas as calcium fluoride by allowing the fluorine component to react with calcium; and an organic solvent component collection step of collecting an organic solvent component in the gasification gas.

In the electrolyte solution used in a lithium ion battery or the like, a fluorine compound of the electrolyte and an organic solvent are included. The fluorine compound is mainly lithium hexafluorophosphate ($LiPF_6$), and the organic solvent is ester carbonates such as dimethyl carbonate (DMC), ethyl methyl carbonate (EMC), diethyl carbonate (DEC), propylene carbonate (PC), and ethylene carbonate (EC). Among them, DMC is a flammable substance classified as Japan Fire Service Act (iv) Class I petroleum, and EMC and DEC are flammable substances classified as Japan Fire Service Act (iv) Class II petroleums.

In this processing method, in order to take the electrolyte solution out of the lithium ion battery safely, after the used lithium ion battery is discharged, a packaging sheet is peeled off, and the electrolyte solution is depressurized and gasified by using a safety valve. In the lithium ion battery, a safety valve for decreasing an excessive internal pressure of the battery is disposed. As illustrated in FIG. 1, the safety valve is opened and a pipe passage 12 is connected to an opening 11. The volatile component of the electrolyte solution is gasified by heating the battery under reduced pressure, and thus the generated gas is introduced to a processing step through the pipe passage 12.

[Gasification Step]

Among the organic solvent included in the electrolyte solution, a boiling point of DMC is 90° C., a boiling point of EMC is 109° C., a boiling point of DEC is 127° C., a boiling point of PC is 240° C., and a boiling point of EC is 244° C. The volatile component (DMC, EMC, DEC, PC, EC, or the like) is gasified by heating the electrolyte solution to a temperature higher than these boiling points. $LiPF_6$ is decomposed by heating or hydrolysis, and thus the fluorine component is gasified.

Specifically, each electrolyte solution at 0° C., 10° C., 20° C., 80° C., and 150° C. under atmospheric pressure (101.3 kPa) is in a state of an atmospheric pressure conversion temperature shown in Table 1 under reduced pressure conditions of 15 kPa, 10 kPa, 5 kPa, 1 kPa, and 0.1 kPa. Accordingly, under the reduced pressure conditions which are selected, the electrolyte solution is heated such that the atmospheric pressure conversion temperature of the electrolyte solution, for example, is higher than or equal to 244° C., and thus it is possible to volatilize DMC, EMC, DEC, PC, EC, or the like.

For example, when the inside of the battery is depressurized to be 5 kPa and is heated at 80° C. to 150° C., the electrolyte solution is in a state of 170° C. to 251° C. at the atmospheric pressure conversion temperature, and thus DMC, EMC, DEC, PC, and EC included in the electrolyte solution, and the thermally decomposed fluorine compound are able to be volatilized. Furthermore, the inside of the battery may be depressurized to be less than 5 kPa, for example, 1 kPa to 0.1 kPa and may be heated at 80° C. to 120° C.

TABLE 1

[Atmospheric Pressure Conversion Temperature]

| Actual Temperature | Pressure | | | | | |
|---|---|---|---|---|---|---|
| | Atmospheric Pressure 101.3 kPa | 15 kPa | 10 kPa | 5 kPa | 1 kPa | 0.1 kPa |
| 0° C. | 0° C. | 49° C. | 58° C. | 74° C. | 108° C. | 152° C. |
| 10° C. | 10° C. | 60° C. | 70° C. | 86° C. | 120° C. | 166° C. |
| 20° C. | 20° C. | 71° C. | 81° C. | 98° C. | 134° C. | 180° C. |
| 80° C. | 80° C. | 139° C. | 151° C. | 170° C. | 210° C. | 262° C. |
| 150° C. | 150° C. | 217° C. | 230° C. | 251° C. | 297° C. | 354° C. |

By heating the electrolyte solution under reduced pressure after a small amount of water is added thereto, the volatile component of the electrolyte solution is gasified. And then, as denoted by the following expression, $LiPF_6$ sequentially reacts with water and is hydrolyzed to phosphoric acid and hydrogen fluoride. Therefore, it is possible to accelerate gasification due to decomposition of $LiPF_6$.

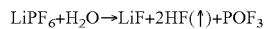
$LiPF_6 + H_2O \rightarrow LiF + 2HF(\uparrow) + POF_3$

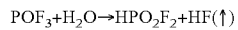
$POF_3 + H_2O \rightarrow HPO_2F_2 + HF(\uparrow)$

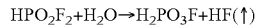
$HPO_2F_2 + H_2O \rightarrow H_2PO_3F + HF(\uparrow)$

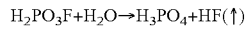
$H_2PO_3F + H_2O \rightarrow H_3PO_4 + HF(\uparrow)$

According to the method of performing the gasification by the addition of water, it is possible to gasify fluorine in a large quantity as HF. In addition, as denoted by the expression described above, fluorine is gasified as HF, and phosphorous becomes $H_3PO_4$ and remains in solution, and thus fractional efficiency of fluorine and phosphorous is excellent. It is preferable that an added amount of water is 5% to 20% with respect to the weight of the electrolyte solution. The state of the added water may be either liquid or gas (moisture vapor). A method of adding water may be any one of a method of adding water to the electrolyte solution in advance, a method of sequentially adding water during the reaction, a method of continuously supplying water, and a method combined thereof.

It is possible to accelerate the decomposition of $LiPF_6$ in the same way by adding a small amount of dilute aqueous mineral acid (inorganic acid) solution to the electrolyte solution. Sulfuric acid, hydrochloric acid, nitric acid, a mixture of two or more thereof, and the like are able to be used as mineral acid. The concentration of the mineral acid in the aqueous mineral acid solution is suitably 0.1 M to 5 M, and the added amount of the aqueous mineral acid solution is preferably 5% to 20% with respect to the weight of the electrolyte solution. When the concentration of the aqueous mineral acid solution is greater than the range described above or the added amount is greater than the range described above, sulfuric acid, hydrochloric acid, and nitric acid are simultaneously volatilized and collected at the time of being depressurized and distilled. Therefore, a harmful effect of decreasing purity or the like is caused at the time of collecting fluorine as calcium fluoride.

The gas of the gasified volatile component is introduced to a wet processing step or a dry processing step, fluorine is immobilized as calcium fluoride, and thus an organic solvent (an oil phase) is collected.

[One Example of Wet Processing]

One example of a wet processing step (water cooling capture) is illustrated in FIG. 1. As illustrated, a battery 10 is contained in heating equipment 15, the pipe passage 12 extending from the opening 11 of the battery 10 is connected to a vacuum pump 13 through a cooler 16 and a water cooling trap 14. In an illustrated example, a two-stage water cooling trap is provided. Water is put into the water cooling trap, and a water temperature is maintained at 0° C. to 10° C. In a state where the battery 10 is heated by the heating equipment 15 and is depressurized by the vacuum pump 13, the electrolyte solution is gasified. The gasification gas is sucked into the vacuum pump 13, is introduced to the cooler 16 through the pipe passage 12 and is cooled to be a condensed solution. The condensed solution is introduced to the water cooling trap 14. At this time, the reduced pressure conditions inside the pipe may be maintained at a constant pressure, the pressure may decrease at a constant speed, or a change of alternately repeating atmospheric pressure and reduced pressure at regular time intervals, or the like may be performed. A depressurizing degree is able to be easily adjusted by controlling the operation of the vacuum pump. The fluorine compound (HF or the like) and the organic solvent component (the organic component: DMC, EMC, DEC, PC, EC, or the like) are subjected to water cooling capture by the water cooling trap 14.

Thus, the organic solvent and the hydrogen fluoride are captured by the water cooling trap 14, and are separated into a water phase and an organic phase. The separated water phase is collected. In such a water phase, the fluorine component of the gasification gas is included. A plurality of stages of the water cooling trap 14 may be disposed in series or in parallel, or may be disposed by combining both dispositions in series and in parallel.

The water phase (fluorine-containing water) is acidic water of less than or equal to pH 2. A calcium compound (calcium carbonate, lime hydrate, calcined lime, or the like) is added to the fluorine-containing water, the fluorine-containing water is neutralized to be pH 5.5 to pH 7.0, fluorine reacts with calcium in the solution, and thus calcium fluoride is precipitated. The calcium fluoride is subjected to solid and liquid separation and is collected.

[Another Example of Wet Processing]

Another example (condensing capture) of the wet processing step is illustrated in FIG. 2. As illustrated, the battery 10 is contained in the heating equipment 15, and the pipe passage 12 extending from the opening 11 of the battery 10 is connected to the vacuum pump 13 through the cooler 16 and the trap 14. In a state where the battery 10 is heated by the heating equipment 15 and is depressurized by the vacuum pump 13, the electrolyte solution is gasified. The gasification gas is sucked into the vacuum pump 13, is introduced to the cooler 16 through the pipe passage 12 and is cooled to be a condensed solution. The condensed solution is introduced to the trap 14. The fluorine compound (HF or the like) and the organic solvent component (the organic component: DMC, EMC, DEC, PC, EC, or the like) is captured by the trap 14.

The solution collected by the trap 14 has an organic solvent component as a main component. When water, an aqueous mineral acid solution, or the like is added at the beginning, moisture is also included. However, since the organic solvent component has high solubility in water, a small amount of moisture is dissolved in the organic solvent component. Therefore, only the organic phase is able to be obtained without separating the water phase. The solution collected by the trap 14 is a fluorine-containing solution (water+an organic solvent) of less than or equal to pH 2. A calcium compound (lime hydrate, calcined lime, or the like) is added to the fluorine-containing solution, the fluorine-containing solution is neutralized to be pH 5.5 to pH 7.0, fluorine reacts with calcium in the solution, and thus calcium fluoride is precipitated. The calcium fluoride is subjected to the solid and liquid separation, and each of the organic solvent of a liquid phase and calcium fluoride of a solid content is collected.

Still another example (calcium absorbing capture) of the wet processing step is illustrated in FIG. 3. As illustrated, the battery 10 is contained in the heating equipment 15, and the pipe passage 12 extending from the opening 11 of the battery 10 is connected to a vacuum pump 13 through a container for a Ca mixed solution 17, the cooler 16, and the trap 14. In a state where the battery 10 is heated by the heating equipment 15 and is depressurized by the vacuum pump 13, the electrolyte solution is gasified. The gasification gas is sucked into the vacuum pump 13 and is introduced to the container for a Ca mixed solution 17 through the pipe passage 12. The fluorine component is absorbed in a Ca mixed solution at the container 17, reacts with a calcium compound, and is immobilized as calcium fluoride. The gasification gas passing through the container 17 is introduced to the cooler 16, is cooled to be a condensed solution, and is introduced to the trap 14. The organic solvent component (an organic component: DMC, EMC, DEC, PC, EC, or the like) is captured by the trap 14.

Thus, the fluorine component reacts with the calcium compound in the container for a Ca mixed solution 17, and calcium fluoride is generated. Calcium carbonate, calcium hydroxide, calcium oxide, calcium sulfate, calcium chloride, and calcium nitrate are able to be used as the calcium compound of the Ca mixed solution, and calcium carbonate which is able to perform granulation of collected calcium fluoride at low cost is preferable. As a liquid of the Ca mixed solution, water or an organic solvent is able to be used. When the liquid is the organic solvent, an electrolyte solution component (DMC, EMC, DEC, PC, EC, or the like) may be used. When the organic solvent of the electrolyte solution is used, a part of the gasified gas may be cooled and condensed, and may be captured in the container for a Ca mixed solution 17. In this case, it is advantageous to the cost.

When a liquid temperature of the Ca mixed solution decreases, the gasified organic solvent is condensed in a large quantity, and thus a liquid amount increases. In order to stabilize the liquid amount of the Ca mixed solution, it is preferable that the solution is kept warm or heated and is gasified so that the liquid amount is adjusted. Furthermore, a plurality of containers for a Ca mixed solution 17 may be disposed in series or in parallel, or may be disposed by combining both dispositions in series and in parallel.

The generated calcium fluoride in the container for a Ca mixed solution 17 is able to be collected by volatilizing a liquid component and by drying a solid material or by performing the solid and liquid separation with respect to suspended solids. The liquid component from which fluorine is removed is filled with a new calcium compound, and thus is able to be used again as the Ca mixed solution.

The organic solvent is captured by the trap 14. The solution collected by the trap 14 has an organic solvent component as a main component. When water, dilute sulfuric acid, or the like is added at the beginning, moisture is also included. However, the organic solvent component has high solubility in water. Therefore, a small amount of moisture is dissolved in the organic solvent component, and thus only the organic phase is able to be obtained without separating the water phase.

[Dry Processing]

A dry processing step is illustrated in FIG. 4. As illustrated, the gasification gas passes through a filling layer of the calcium compound, fluorine in the gas reacts with calcium, and thus calcium fluoride is generated. This calcium fluoride is extracted from the filling layer, and the filling layer is filled with a new calcium compound and is used. Meanwhile, the gas passing through the filling layer is introduced to a condensation trap, and the organic solvent component is collected. A plurality of filling layers of the calcium compound may be disposed in series or in parallel, or may be disposed by combining both dispositions in series and in parallel.

In the aggregation trap of the dry processing, water is not necessary, and it is possible for the captured gas to be used as fuel of combustion equipment or a combustion improver since it is condensed only to be an organic solvent phase. In addition, the operation of the dry processing is simple, and a drainage treatment is not necessary.

In the gasification step, when the gasification is performed at a pressure higher than a vapor pressure of water, the gasification gas is able to be introduced to the wet processing step or the dry processing step and is able to be processed. In contrast, when the gasification is performed at a pressure lower than a vapor pressure of water, the gasification gas is introduced to the dry processing step and is processed because the water cooling capture is not suitable.

The gasification gas is cooled by the cooler 16 up to reduced pressure of approximately 5 kPa. When the gasification gas is generated by heating the electrolyte solution in a depressurized state stronger than the reduced pressure, for example, in a depressurized state of 1 kPa and 0.1 kPa, the water cooling trap is not suitable because the pressure of the gasification gas is lower than the vapor pressure of water even when it is cooled to 10° C. by the cooler 16. In this case, the gasification gas is introduced to the dry processing step and is processed.

In contrast, when the electrolyte solution is heated and the volatile component is gasified in a depressurized state of 5 kPa to ordinary pressure, the pressure is higher than the vapor pressure of water when the gasification gas is cooled to be lower than or equal to 10° C. by the cooler 16. Therefore, the gasification gas is able to be introduced to the wet processing step and is able to be processed. Furthermore, the gasification gas may be introduced to a dry step.

Advantageous Effects of Invention

According to the processing method of the present invention, fluorine is able to be recycled as a hydrofluoric acid manufacturing raw material or a cement raw material because fluorine is collected from the electrolyte solution as calcium fluoride having high purity. According to the processing method of the present invention, it is possible to obtain calcium fluoride having a purity higher than or equal to 80%.

Further, according to the processing method of the present invention, the organic solvent of the electrolyte solution is able to be collected and used as fuel or alternative fuel. Because fluorine is separated from the organic solvent component collected by the processing method of the present invention, a harmful substance such as hydrogen fluoride is not generated at the time of using the collected organic solvent component as fuel. Therefore, it is possible to safely use the organic solvent component.

In addition, according to the processing method of the present invention, since the electrolyte solution is gasified and obtained from the battery, it is possible to detoxify the battery without freezing or combustion at a high temperature. Therefore, it is possible to safely and efficiently perform material recycling in the subsequent stage.

DESCRIPTION OF EMBODIMENTS

Figure 1:
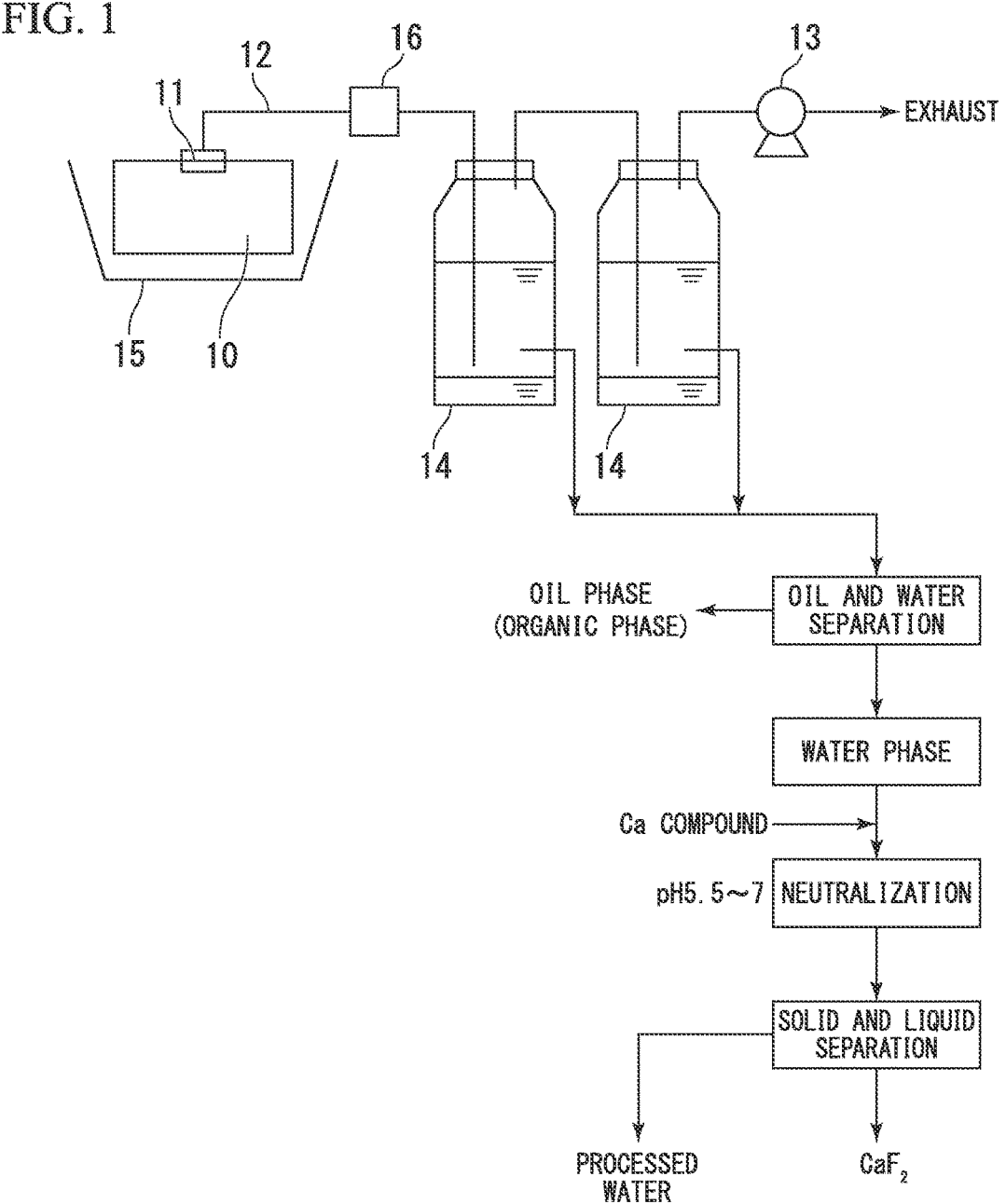
FIG. 1 is a conceptual diagram illustrating wet processing (water cooling capture) of one embodiment of the present invention.
Figure 2:
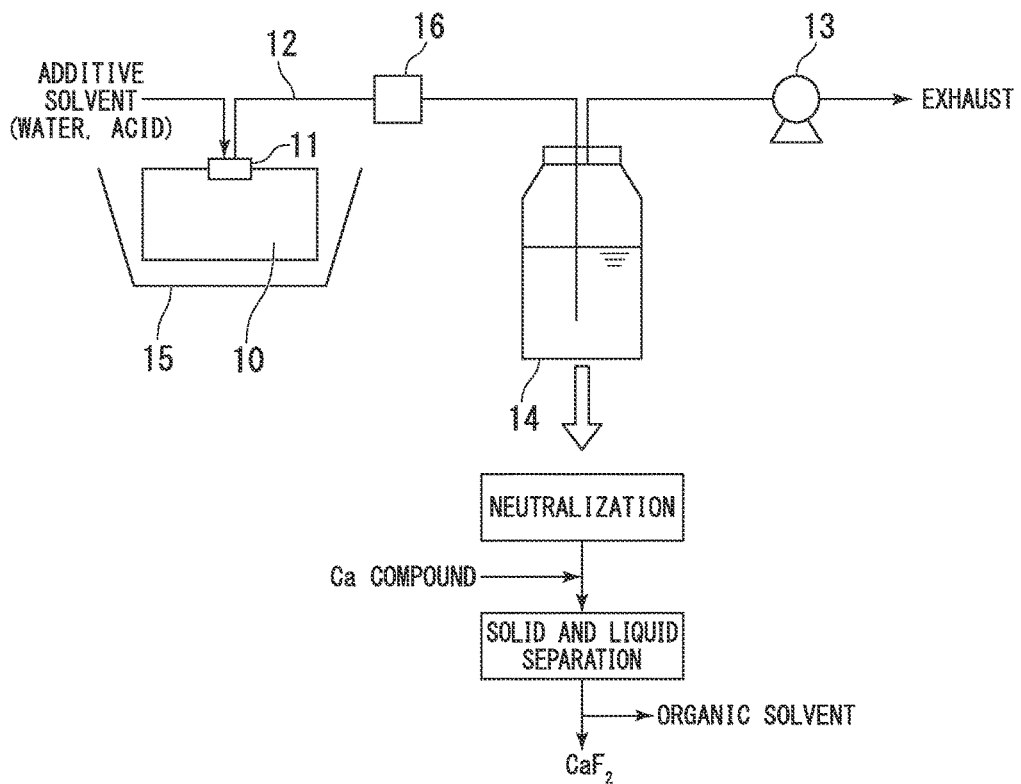
FIG. 2 is a conceptual diagram illustrating wet processing (condensing capture) of another embodiment.
Figure 3:
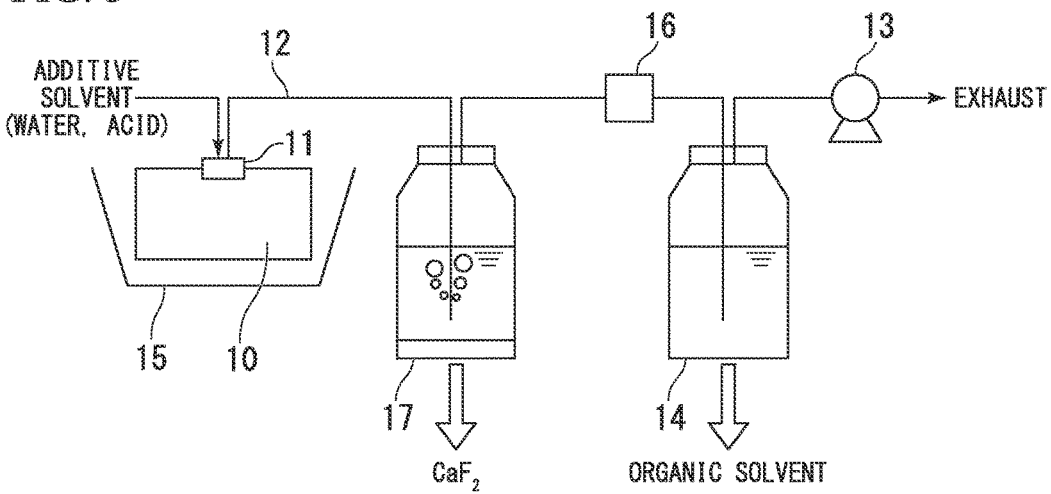
FIG. 3 is a conceptual diagram illustrating wet processing (calcium absorbing capture) of still another embodiment.
Figure 4:
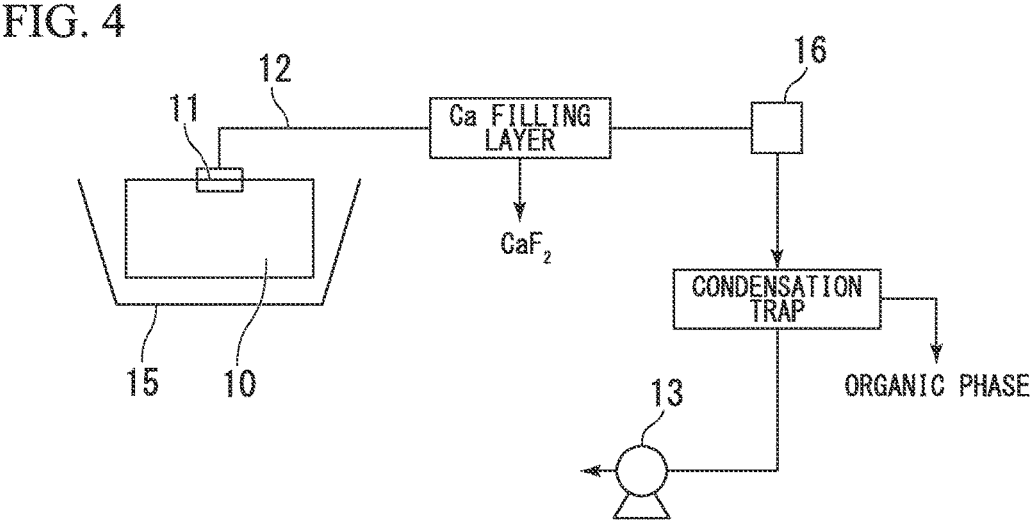
FIG. 4 is a conceptual diagram illustrating dry processing of yet another embodiment.

Examples of the present invention will be described later. Furthermore, the component of the organic phase liquid was analyzed by a gas chromatography mass spectrometer. The pH of the liquid was analyzed by a glass electrode method. The fluorine concentration was analyzed by a fluoride ion electrode method. The electrolyte solution of Examples 2 to 5 is (1 mol/L of $LiPF_6$ solution [Solvent: EC/DMC/EMC/DEC=30/30/30/10=(v/v/v/v)]).

EXAMPLE 1

Water Cooling Capture

The large-sized battery cell for an automobile (the lithium ion battery, 1.66 kg) was discharged, the packaging sheet was peeled off, the safety valve was opened, and 18 g of water was added. Then, the pipe passage was connected to the opening of the safety valve, the depressurization was performed up to 5 kPa by the vacuum pump, and the large-sized battery cell was immersed in an oil heater and was heated at 150° C. for 2 hours. The generated gas was sequentially introduced to the cooling pipe (4° C.), and the water cooling trap (liquid amount 300 mL), and was captured. The captured gas was allowed to stand at room temperature and was separated into the water phase and the organic phase. 340 mL of the separated water phase and 120 mL of the organic phase were collected. The fluorine concentration of the water phase was 10 g/L and pH 2. 6.0 g of lime hydrate was added thereto, and the precipitate was generated. The collected precipitate was analyzed by an X-ray powder diffraction, and it was confirmed that the collected precipitate was calcium fluoride. The collected amount of calcium fluoride was 6.3 g, and purity thereof was 80%. On the other hand, the separated organic phase was collected and the components thereof were analyzed. The components of the solution were DMC, EMC, DEC, and EC.

EXAMPLE 2

Water Cooling Capture 21.5 g of aqueous sulfuric acid solution of 1.5 mol/L was added to 100 mL of the electrolyte solution, the pipe passage was connected, the depressurization was performed up to 5 kPa by the vacuum pump, and the large-sized battery cell was immersed in the oil heater and was heated at 120° C. for 2 hours. The generated gas was sequentially introduced to the cooling pipe (4° C.), and the water cooling trap (the liquid amount of 200 mL), and was captured. The captured gas was allowed to stand at room temperature and was separated into the water phase and the organic phase. 230 mL of the water phase and 35 mL of the organic phase were collected. The fluorine concentration of the water phase was 43 g/L and pH 2. The water phase was collected, 18 g of lime hydrate was added, and the precipitate was generated. The collected precipitate was analyzed by an X-ray powder diffraction, and it was confirmed that the collected precipitate was calcium fluoride. The collected amount of calcium fluoride was 20 g, and the purity thereof was 92%. It was found that the calcium fluoride was able to be used as the hydrofluoric acid manufacturing raw material. On the other hand, the separated organic phase was collected and the components thereof were analyzed. The components of the solution were DMC, EMC, DEC, and EC.

EXAMPLE 3

Aggregation Capture 21.5 g of water was added to 100 mL of the electrolyte solution, the pipe passage was connected, the depressurization was performed up to 5 kPa by the vacuum pump, and the large-sized battery cell was immersed in the oil heater and was heated at 120° C. for 2 hours. The generated gas was condensed in the cooling pipe (4° C.), and was captured in a capturing bottle. The collected liquid was 95 mL, and only the organic phase was collected. The fluorine concentration of the collected liquid was 87 g/L and pH 2. 15 g of lime hydrate was added thereto, and the precipitate was generated. The collected precipitate was analyzed by an X-ray powder diffraction, and it was confirmed that the collected precipitate was calcium fluoride. The collected amount of calcium fluoride was 14 g, and the purity thereof was 93%. It was found that the calcium fluoride was able to be used as the hydrofluoric acid manufacturing raw material. The organic phase was analyzed, and the components of the solution were DMC, EMC, DEC, and EC.

EXAMPLE 4

Aggregation Capture 21.5 g of water was added to 100 mL of the electrolyte solution, the pipe passage was connected, and the large-sized battery cell was immersed in the oil heater at 120° C. An operation in which the depressurization was performed up to 20 kPa by the vacuum pump and maintained for 10 minutes, and then the vacuum pump was stopped, the inside of the pipe returned to atmospheric pressure, and then the vacuum pump was operated again, the depressurization was performed up to 20 kPa, the vacuum pump was stopped after a period of 10 minutes, and the inside of the pipe returned to atmospheric pressure was repeated for 2 hours. The generated gas was condensed in the cooling pipe (4° C.), and was captured in the capturing bottle. The collected liquid was 101 mL, and only the organic phase was collected. The fluorine concentration of the collected liquid was 93 g/L and pH 1.9. 17 g of lime hydrate was added thereto, and the precipitate was generated. The collected precipitate was analyzed by an X-ray powder diffraction, and it was confirmed that the collected precipitate was calcium fluoride. The collected amount of calcium fluoride was 19 g, and the purity thereof was 88%. It was found that the calcium fluoride was able to be used as the hydrofluoric acid manufacturing raw material. The organic phase was analyzed, and the components of the solution were DMC, EMC, DEC, and EC.

EXAMPLE 5

Ca Absorbing Capture 21.5 g of water was added to 100 mL of the electrolyte solution, the pipe passage was connected, the depressurization was performed up to 15 kPa by the vacuum pump, and the large-sized battery cell was immersed in the oil heater and was heated at 120° C. for 2 hours. The generated gas passed through a calcium suspension liquid (adjusted by 30 g of calcium carbonate, 100 mL of water, and 30° C. to 60° C.), and the gasified fluorine was absorbed and immobilized as calcium fluoride. The organic solvent or the like was subsequently condensed by the cooler (4° C.), and was captured in the capturing bottle. The precipitate collected in the calcium suspension liquid was analyzed by an X-ray powder diffraction, and it was confirmed that the precipitate was a mixture of calcium fluoride and calcium carbonate. The collected liquid which was condensed by the cooler was 80 mL, and was only in the organic phase. The fluorine concentration of the collected liquid was 5 mg/L and pH 6.2, and included almost no fluorine. The organic phase was analyzed, and the components of the solution were DMC, EMC, DEC, and EC.

EXAMPLE 6

Dry Processing

The large-sized battery cell for an automobile (the lithium ion battery, 1.66 kg) was discharged, the packaging sheet was peeled off, the safety valve was opened, 18 g of water was added, the pipe passage was connected, the depressurization was performed up to 5 kPa by the vacuum pump, and the large-sized battery cell was immersed in an oil heater and was heated at 150° C. for 2 hours. The generated gas was introduced to the filling layer of calcium carbonate.

After passing the gas therethrough, the filling layer of calcium carbonate was obtained and the components thereof were analyzed by an X-ray powder diffraction. The components thereof were unreacted calcium carbonate and calcium fluoride. On the other hand, the gas passing through the filling layer was introduced to the condensation trap (0° C.) and was stored. When the components of the condensed solution were analyzed, the components of the collected liquid were DMC, EMC, DEC, and EC. The fluorine concentration was 30 mg/L.

INDUSTRIAL APPLICABILITY

According to the processing method of the present invention, it is possible to recycle fluorine as a hydrofluoric acid manufacturing raw material or a cement raw material because fluorine is collected from the electrolyte solution as calcium fluoride having high purity. Further, according to the processing method of the present invention, the organic solvent of the electrolyte solution is able to be collected and used as fuel or alternative fuel. Because fluorine is separated from the organic solvent component collected by the processing method of the present invention, a harmful substance such as hydrogen fluoride is not generated at the time of being used as fuel, and it is possible to safely use the organic solvent component. In addition, according to the processing method of the present invention, it is possible to detoxify the battery without freezing or combustion at a high temperature because the electrolyte solution is gasified and obtained from the battery. Therefore, it is possible to safely and efficiently perform material recycling. Accordingly, the present invention has industrial applicability.

REFERENCE SIGNS LIST

10: BATTERY
11: OPENING
12: PIPE PASSAGE
13: VACUUM PUMP
14: WATER COOLING TRAP
15: HEATING EQUIPMENT
16: COOLER
17: CONTAINER FOR Ca MIXED SOLUTION

The invention claimed is:
1. A method for processing a fluorine-containing electrolyte solution including a volatile fluorine compound and a volatile organic solvent, the method comprising:
a gasification step of gasifying volatile components included in the electrolyte solution by heating the electrolyte solution under reduced pressure which is lower than atmospheric pressure;
a fluorine immobilization step of immobilizing a fluorine compound included in gas of gasified volatile components as a calcium fluoride by allowing the fluorine compound to be reacted with a calcium compound; and
an organic solvent recovery step of recovering the organic solvent in the gas,
wherein, in the gasification step,
water or an aqueous mineral acid solution is added to the electrolyte solution, and then
the electrolyte solution is heated under the reduced pressure, and thereby,
the organic solvent in the electrolyte solution is gasified,
lithium hexafluorophosphate in the electrolyte solution is reacted with water and is hydrolyzed to phosphoric acid and hydrogen fluoride, and
phosphoric acid is remained in a solution and hydrogen fluoride is gasified.
2. The method for processing a fluorine-containing electrolyte solution according to claim 1,
wherein in the fluorine immobilization step and the organic solvent recovery step,
the fluorine compound and the organic solvent included in the gas are collected by passing the gas through a cooling water,
the organic solvent is recovered by separating the organic solvent from a liquid including the fluorine compound,
the fluorine compound is reacted with the calcium compound by adding the calcium compound to the liquid including the fluorine compound, and thereby the calcium fluoride is generated.
3. The method for processing a fluorine-containing electrolyte solution according to claim 1,
wherein in the fluorine immobilization step and the organic solvent recovery step,
the fluorine compound and the organic solvent included in the gas are condensed into a liquid, the fluorine compound is reacted with the calcium compound by adding the calcium compound to the condensed liquid including the fluorine compound, and thereby the calcium fluoride is generated.

4. The method for processing a fluorine-containing electrolyte solution according to claim 1, wherein in the fluorine immobilization step and the organic solvent recovery step, the fluorine compound included in the gas is absorbed by a mixed solution including the calcium compound by bringing the gas into contact with the mixed solution, the calcium fluoride is generated by allowing fluorine compound to be reacted with the calcium compound in the mixed solution, and the organic solvent is recovered by condensing the gas after contacting the mixed solution.

5. The method for processing a fluorine-containing electrolyte solution according to claim 1, wherein in the fluorine immobilization step and the organic solvent recovery step, the fluorine compound included in the gas is reacted with the calcium compound by passing the gas through a filling layer filled with the calcium compound, thereby calcium fluoride is generated, and the organic solvent is recovered by condensing the gas passed through the filling layer.

6. The method for processing a fluorine-containing electrolyte solution according to claim 2, wherein, in the gasification step, the electrolyte solution is heated at 80° C. to 150° C. under the reduced pressure which is equal to or higher than 5 kPa and is lower than the atmospheric pressure, thereby the volatile components are gasified.

7. The method for processing a fluorine-containing electrolyte solution according to claim 5, wherein, in the gasification step, the electrolyte solution is heated at 80° C. to 150° C. under the reduced pressure of less than or equal to 1 kPa, thereby the volatile components are gasified.

8. The method for processing a fluorine-containing electrolyte solution according to claim 1, wherein the calcium fluoride is recovered to be recycled, and the recovered organic solvent is used as fuel or alternative fuel.

9. The method for processing a fluorine-containing electrolyte solution according to claim 1, wherein, in the gasification step, a pipe passage is connected to an opening portion of a used battery in which the electrolyte solution including the fluorine compound is stored, the used battery is heated under the reduced pressure, thereby the volatile components of the electrolyte solution are gasified, wherein the gas is introduced to the fluorine immobilization step and the organic solvent recovery step through the pipe passage.

10. The method for processing a fluorine-containing electrolyte solution according to claim 9, wherein a safety valve of the used battery is opened, the pipe passage is connected to the opened safety valve, and the volatile components of the electrolyte solution are gasified by heating the battery under the reduced pressure.

11. The method for processing a fluorine-containing electrolyte solution according to claim 9, wherein safety valves of a plurality of used batteries are opened, the batteries are contained in a hermetic container, the pipe passage is connected to the container, and the volatile components of the electrolyte solution are gasified by heating the batteries under the reduced pressure.

12. The method for processing a fluorine-containing electrolyte solution according to claim 1, wherein an amount of the water or the aqueous mineral acid solution which is added to the electrolyte solution is 5% to 20% with respect to a weight of the electrolyte solution.

13. The method for processing a fluorine-containing electrolyte solution according to claim 3, wherein, in the gasification step, the electrolyte solution is heated at 80° C. to 150° C. under the reduced pressure which is equal to or higher than 5 kPa and is lower than the atmospheric pressure, thereby, the volatile components are gasified.

14. The method for processing a fluorine-containing electrolyte solution according to claim 4, wherein, in the gasification step, the electrolyte solution is heated at 80° C. to 150° C. under the reduced pressure which is equal to or higher than 5 kPa and is lower than the atmospheric pressure, thereby the volatile components are gasified.

15. The method for processing a fluorine-containing electrolyte solution according to claim 5, wherein, in the gasification step, the electrolyte solution is heated at 80° C. to 150° C. under the reduced pressure which is equal to or higher than 5 kPa and is lower than the atmospheric pressure, thereby the volatile components are gasified.

* * * * *